Patented Nov. 18, 1930

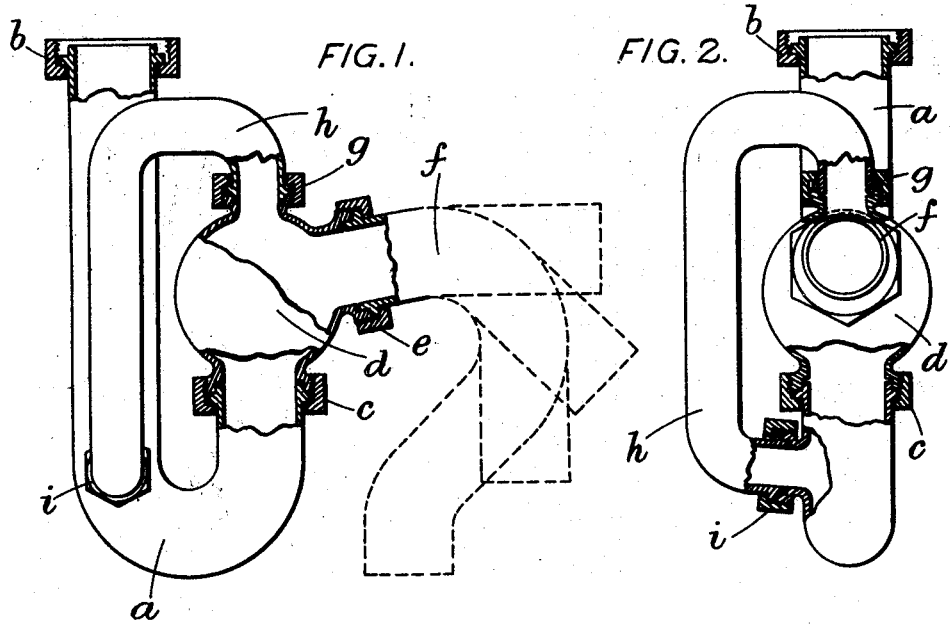
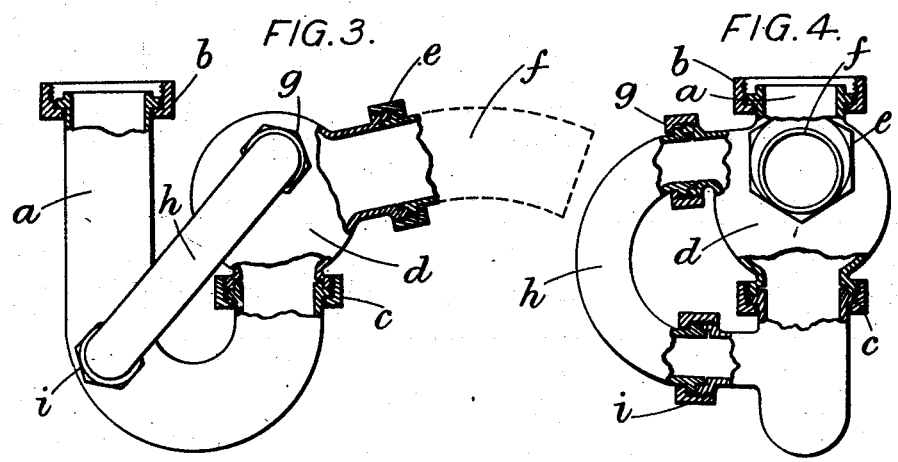

1,781,683

UNITED STATES PATENT OFFICE

JOHN McDERMID, OF ENNERDALE, ENGLAND

ANTISIPHONIC LIQUID-SEAL TRAP

Application filed March 14, 1930, Serial No. 435,777, and in Great Britain March 23, 1929.

This invention relates to sanitary liquid traps and more particularly to traps of the type in which liquid seals are provided in U-shaped or other shaped bends interposed between the inlet and outlet ends of the pipe and in which, in order to prevent unsealing of the trap, an external antisiphoning pipe is used, connecting a point above the water level in the outlet side of the pipe to a point below the water level on the inlet side of the pipe, and in which a chamber is provided in the outlet side of the trap so that when discharge takes place a sufficient quantity of liquid is retained in it to flow back and reform the seal.

According to the present invention a siphon trap is provided with an antisiphon bye-pass tube or pipe which is detachable from the trap in combination with a spherical or like enlarged chamber interposed between the trap and the outlet. The antisiphoning pipe may be connected to the top of the chamber or to one side thereof, and the chamber may be detachable from the trap fitting, in which case provision is preferably made for adjustability of the chamber on its axis to provide for varying distances between the inlet of the trap and its outlet.

In order that the invention may be clearly understood reference will now be made to the accompanying drawings which illustrate embodiments of the invention and in which:—

Fig. 1 is a side elevation partly in section of an antisiphoning trap as applied to a lavatory basin, sink or the like.

Fig. 2 shows a front elevation partly in section of the same.

Fig. 3 shows a side elevation partly in section of a similar trap suitable for a bath.

Fig. 4 shows a front elevation partly in section of the same.

Referring more particularly to Figs. 1 and 2, $a$ is a U-shaped pipe fitted at the end of its inlet limb with a union nut $b$ and at the end of its outlet limb with a union nut $c$.

By means of the union nut $c$ the outlet limb of the U-shaped pipe $a$ is connected to a neck at the bottom of a chamber $d$ of larger diameter than the pipe $a$. This chamber $d$ is preferably, as shown, of spherical shape.

On one side the chamber $d$ is provided with a neck fitted with a union nut $e$ whereby it is connected to an extension pipe $f$.

The chamber $d$ is also provided on top with a neck diametrically opposite and coaxial with the neck at the bottom and fitted with a union nut $g$.

An antisiphoning pipe $h$ is at one end connected by the union nut $g$ to the top of the chamber $d$, and at its other end by a union nut $i$ to a neck on the side of the lower portion of the inlet limb of the U-shaped pipe $a$.

Owing to the coaxial alignment of the union nuts $c$ and $g$, the chamber $d$ can be rotated about the axis of said nuts so that the extension pipe $f$ can be joined to a waste pipe or other plumbing fitting at varying distances from the axis of the inlet limb of the U-shaped pipe $a$.

The union nuts $g$ and $i$ permit the antisiphoning pipe $h$ to be detached from the chamber $d$ and U-shaped pipe $a$ in the event of such pipe $h$ or the trap $a$ or outlet extension pipe $f$ becoming choked.

The bulbous enlargement provided by the chamber $d$ enables sufficient liquid to be retained to provide a seal after discharge through the trap has taken place.

The antisiphoning pipe $h$ serves to restore atmospheric pressure above the liquid in the chamber $d$ as soon as the liquid level in the inlet limb of the U-shaped pipe $a$ has descended below and uncovered the lower end of the antisiphoning pipe $h$, and thus prevents the liquid siphoning out of the trap and down the pipe $f$.

In the modification shown in Figs. 3 and 4, the antisiphoning pipe $h$ is connected to the side of the chamber $d$ instead of to the top thereof. Rotational adjustment of the chamber $d$ is therefore precluded. This form of construction is more suitable where absence of space does not permit of the antisiphoning pipe being connected to the top of the chamber $d$, such for instance as in bath traps.

The trap, spherical chamber and extension fitting can be constructed of any suitable material such as lead, iron, brass, copper, earthenware, or the like, and can be formed in various sizes to suit different requirements.

I claim:

1. In an antisiphoning trap, a U-shaped pipe, a chamber of larger diameter than said U-shaped pipe connected to the outlet limb of said U-shaped pipe, an antisiphoning pipe detachably connected to the lower portion of the inlet limb of said U-shaped pipe and to said chamber, and an outlet pipe connected to said chamber.

2. In an antisiphoning trap, a U-shaped pipe, a spherical chamber of larger diameter than said U-shaped pipe connected to the outlet limb of said U-shaped pipe, an antisiphoning pipe detachably connected to the lower portion of the inlet limb of said U-shaped pipe and to said chamber, and an outlet pipe connected to said chamber.

3. In an antisiphoning trap, a U-shaped pipe, a chamber of larger diameter than said U-shaped pipe detachably connected to the outlet limb of said U-shaped pipe, an antisiphoning pipe detachably connected to the lower portion of the inlet limb of said U-shaped pipe and to said chamber, and an outlet pipe detachably connected to said chamber.

4. In an antisiphoning trap, a U-shaped pipe, a chamber of larger diameter than said U-shaped pipe detachably connected to the outlet limb of said U-shaped pipe, an antisiphoning pipe detachably connected to the lower portion of the inlet limb of said U-shaped pipe and to the top of said chamber in axial alignment with the connection thereof to the outlet limb of said U-shaped pipe, and an outlet pipe connected to said chamber.

5. In an antisiphoning trap, a U-shaped pipe, a spherical chamber of larger diameter than said U-shaped pipe detachably connected to the outlet limb of said U-shaped pipe, an antisiphoning pipe detachably connected to the lower portion of the inlet limb of said U-shaped pipe and to the top of said chamber in axial alignment with the connection thereof to the outlet limb of said U-shaped pipe, and an outlet pipe connected to said chamber.

In testimony whereof I have signed my name to this specification.

JOHN McDERMID.